(12) United States Patent
Matsui et al.

(10) Patent No.: US 10,620,372 B2
(45) Date of Patent: Apr. 14, 2020

(54) ALIGNMENT APPARATUS AND ALIGNMENT METHOD

(71) Applicant: NIPPON TELEGRAPH AND TELEPHONE CORPORATION, Tokyo (JP)

(72) Inventors: Takashi Matsui, Tskuba (JP); Kazuhide Nakajima, Tsukuba (JP); Taiji Sakamoto, Tsukuba (JP); Koutaro Saito, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/062,034

(22) PCT Filed: Dec. 27, 2016

(86) PCT No.: PCT/JP2016/088997
§ 371 (c)(1),
(2) Date: Jun. 13, 2018

(87) PCT Pub. No.: WO2017/130627
PCT Pub. Date: Aug. 3, 2017

(65) Prior Publication Data
US 2018/0372954 A1 Dec. 27, 2018

(30) Foreign Application Priority Data
Jan. 25, 2016 (JP) .................................. 2016-011873

(51) Int. Cl.
*G02B 6/255* (2006.01)
*G02B 6/38* (2006.01)
(Continued)

(52) U.S. Cl.
CPC ............ *G02B 6/2555* (2013.01); *G01B 11/27* (2013.01); *G02B 6/02042* (2013.01);
(Continued)

(58) Field of Classification Search
CPC .. G02B 6/2555; G02B 6/4221; G02B 6/3843; G02B 6/02042; G02B 6/3885; G01B 11/27; G01B 11/002
See application file for complete search history.

(56) References Cited

U.S. PATENT DOCUMENTS 5,758,000 A  5/1998  Zheng
2002/0159724 A1* 10/2002  Oki ...................... G02B 6/2551
                                                              385/97
(Continued)

FOREIGN PATENT DOCUMENTS

CN   101419311 B   12/2010
EP   1253448 A2    10/2002
(Continued)

OTHER PUBLICATIONS

English Translation of the International Preliminary Report on Patentability for PCT/JP2016/088997, IB, Geneva, dated Jul. 31, 2018, incorporating the English translation of the Written Opinion of the ISA/JP, Tokyo, dated Apr. 11, 2017.
(Continued)

*Primary Examiner* — Hina F Ayub (57) ABSTRACT

An alignment apparatus that can efficiently align an optical fiber, and an alignment method will be provided.
According to the embodiments, the alignment apparatus that aligns an optical fiber comprises an acquisition unit, a calculation unit, and a rotation processing unit. The acquisition unit acquires one or more side images of the optical fiber. The calculation unit calculates correlation coefficients between the luminances of the one or more side images and
(Continued)

those of one or more reference side images. The rotation processing unit rotates the optical fiber in the axis direction of the optical fiber so that the correlation coefficients peak.

14 Claims, 11 Drawing Sheets

(51) Int. Cl.
  G01B 11/27 (2006.01)
  G02B 6/02 (2006.01)
  G02B 6/42 (2006.01)
  G01B 11/00 (2006.01)
(52) U.S. Cl.
  CPC ......... G02B 6/3843 (2013.01); G02B 6/3885 (2013.01); G02B 6/4221 (2013.01); G01B 11/002 (2013.01)

(56) References Cited

U.S. PATENT DOCUMENTS

| 2010/0209049 A1 | 8/2010 | Zheng et al. |
| 2014/0044339 A1* | 2/2014 | Onozaki ............... G02B 6/2551 382/141 |
| 2018/0000341 A1* | 1/2018 | Tomatsu ................ A61B 3/102 |

FOREIGN PATENT DOCUMENTS

| JP | H02-310505 A | 12/1990 |
| JP | H08-015563 A | 1/1996 |
| JP | H08-114720 A | 5/1996 |
| JP | H10-082627 A | 3/1998 |
| JP | 2002-328253 A | 11/2002 |
| JP | 2005-099362 A | 4/2005 |
| JP | 2005-173210 A | 6/2005 |
| JP | 4190997 B2 | 12/2008 |
| JP | 2012504786 A | 2/2012 |
| JP | 2013-050695 A | 3/2013 |
| JP | 2014-122962 A | 7/2014 |
| WO | WO-2015098863 A1 | 7/2015 |

OTHER PUBLICATIONS

Extended European Search Report regarding EPSN168882116, dated Jun. 12, 2019.
Japanese First Office Action regarding JPSN 2017-563747, dated Mar. 5, 2019.
International Search Report for PCT/JP2016/088997, ISA/JP, Tokyo, dated Apr. 11, 2017, with English translation.
Written Opinion of the ISA for PCT/JP2016/088997, ISA/JP, Tokyo, dated Apr. 11, 2017.
Kengo Watanabe et al., "Study of Fusion Splice for Multicore Fiber", The Institute of Electrical Engineers of Japan Kenkyukai Shiryo, Nov. 17, 2011 (Nov. 17, 2011), CMN-11, 43.45-64, pp. 31-34.
Kengo Watanabe et al., "Study of Fusion Splice for Single-Mode Multicore Fiber", in MOC 2011, H-8, (Oct. 30-Nov. 2, 2011).
Yoshimichi Amma et al., "Low-loss fusion splice technique for multicore fiber with a large cladding diameter", OCS 2013-41, pp. 27-32, (Aug. 2013).
Luigi Di Stefano et al., "ZNCC-based template matching using bounded partial correlation", Pattern Recog. Letters, vol. 26, Iss. 14, pp. 2129-2134, May 3, 2005.
Chinese Office Action regarding CN2016800798358, dated Aug. 2, 2019.
European Office Action regarding EP 168882116, dated Jan. 22, 2020.
Japanese Office Action regarding JP2017563747, dated Nov. 26, 2019.

* cited by examiner

ALIGNMENT APPARATUS AND ALIGNMENT METHOD

CROSS-REFERENCE TO RELATED APPLICATIONS

This is a U.S. national phase application under 35 U.S.C. 371 of International Application No. PCT/JP2016/088997 (not published in English), filed Dec. 27, 2016, which claims priority to JP2016/011873, filed on Jan. 25, 2015. The entire disclosures of the above applications are incorporated by reference herein.

FIELD

The embodiments of the present invention relate to an alignment apparatus that aligns an optical fiber, and an alignment method.

BACKGROUND

An alignment apparatus that aligns an optical fiber needs to not only perform alignment in the horizontal and vertical directions of a cross section of the optical fiber, but also align a rotation angle whose central axis is the longitudinal direction of the optical fiber. To align a rotation angle, some alignment apparatuses use active alignment, and some alignment apparatuses use passive alignment. Some alignment apparatuses using passive alignment perform alignment by observing an end face of an optical fiber, or by observing a side of an optical fiber by use of two markers on the orthogonal axis of the optical fiber.

Also, the technique of aligning an optical fiber having a core in its central portion, and the technique of aligning an optical fiber having two cores are published.

SUMMARY

However, an alignment apparatus using active alignment is not suitable for work in a field, because a location where optical fibers are connected is apart from a location where power is monitored. An alignment apparatus that performs alignment by observing an end face of an optical fiber needs a complicated optical system such as a mirror for accurate core positioning. An alignment apparatus that performs alignment by observing a side of an optical fiber by use of two markers needs two types of different hole markers; an influence on connection characteristics of the hole markers is not clear.

In the technique of aligning an optical fiber having a core in its central portion, a connection method for enabling a connection in a predetermined polarization while performing rotation alignment is suggested. However, its applicability to a multi-core optical fiber is unclear; it is not clear if the connection of multi-core optical fibers by rotation alignment can be achieved. In the technique of aligning an optical fiber having two cores, applying the technique to an optical fiber having two cores is suggested. However, it is impossible to pinpoint each core for connection.

To solve the above problems, an alignment apparatus that can efficiently align an optical fiber, and an alignment method will be provided.

According to the embodiments, the alignment apparatus that aligns an optical fiber comprises an acquisition unit, a calculation unit, and a rotation processing unit. The acquisition unit acquires one or more side images of the optical fiber. The calculation unit calculates correlation coefficients between the luminances of the one or more side images and those of one or more reference side images. The rotation processing unit rotates the optical fiber in the axis direction of the optical fiber so that the correlation coefficients peak.

According to the embodiments, the alignment apparatus can align a rotation angle of an optical fiber on the basis of side images of the optical fiber, and reference side images. As a result, the alignment apparatus can efficiently align a rotation angle of the optical fiber.

EMBODIMENTS

The embodiments will be described below with reference to the drawings.

First Embodiment

The alignment apparatus according to the embodiments aligns a rotation angle of an optical fiber. For example, the alignment apparatus rotatably retains an optical fiber, and, in the longitudinal direction of the optical fiber (direction where the optical fiber extends), fixes a different optical fiber from the aforementioned optical fiber. The alignment apparatus rotates the former optical fiber, and fixes it in the position of aligning with the latter optical fiber.

Figure 1:
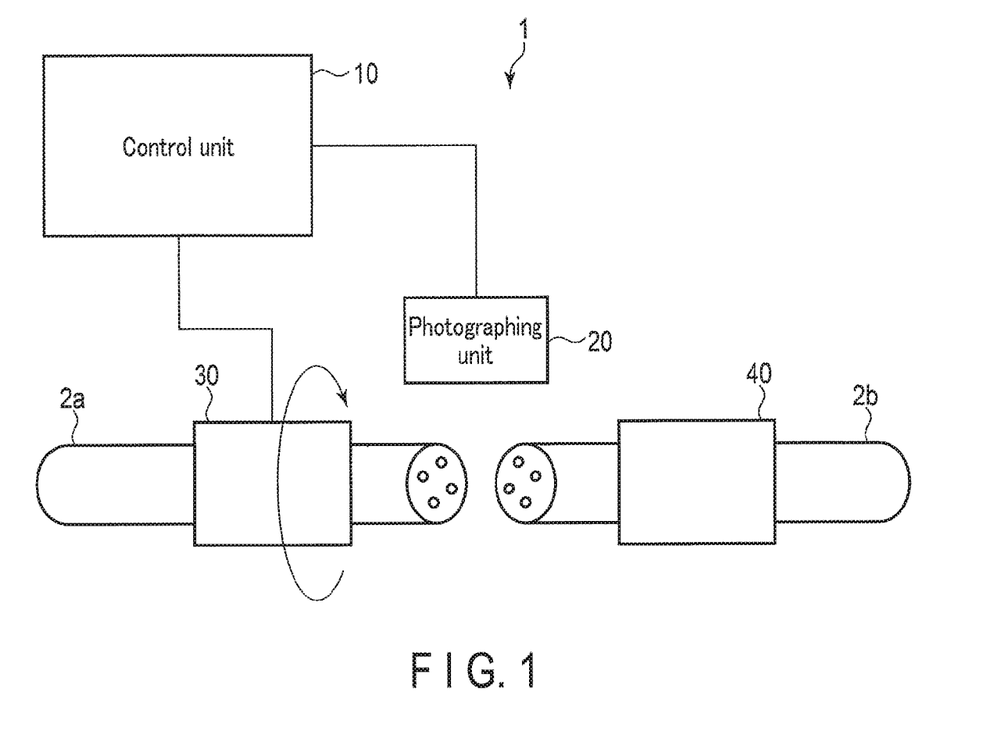
FIG. 1 is a block diagram showing a configuration example of the alignment apparatus according to the first embodiment.

FIG. 1 shows a configuration example of an alignment apparatus 1 according to the first embodiment.

Here, the alignment apparatus 1 aligns an optical fiber 2a with an optical fiber 2b. The optical fibers 2a and 2b are, for example, multi-core fibers each of which has a plurality of cores in its cladding. The optical fibers 2a and 2b are, for example, four-core fibers or eight-core fibers. The configurations of the optical fibers 2a and 2b are not restricted to particular configurations.

As shown in FIG. 1, the alignment apparatus 1 comprises a control unit 10, a photographing unit 20, grippers 30 and 40, etc.

The control unit 10 controls the whole of the alignment apparatus 1. The control unit 10 aligns the optical fiber 2a on the basis of images photographed by the photographing unit 20.

The control unit 10 is comprised by a CPU, a ROM, a RAM, an NVM, and an interface, for example. The control unit 10 may be a desktop PC, a notebook PC, or a tablet PC, for example.

The functions achieved by the control unit 10 can be achieved by execution of a program by the CPU, for example. That is, the program is used for a computer that operates as at least a part of the alignment apparatus 1.

The functions of the control unit 10 will be described later.

The photographing unit 20 photographs side images of the optical fibers 2a and 2b. The photographing unit 20 is set in the vicinity of the position where an end face of the optical fiber 2a and an end face of the optical fiber 2b face each other, and photographs a side of the optical fiber 2a and a side of the optical fiber 2b at the same time, for example. The photographing unit 20 is comprised by a CCD, etc., for example. The photographing unit 20 photographs side images by use of visible light or invisible light. The photographing unit 20 transmits the photographed images to the control unit 10.

The photographing unit 20 photographs the optical fibers 2a and 2b on two sides. The photographing unit 20 photographs the optical fibers 2a and 2b in two directions orthogonal to each other, for example.

Figure 2:
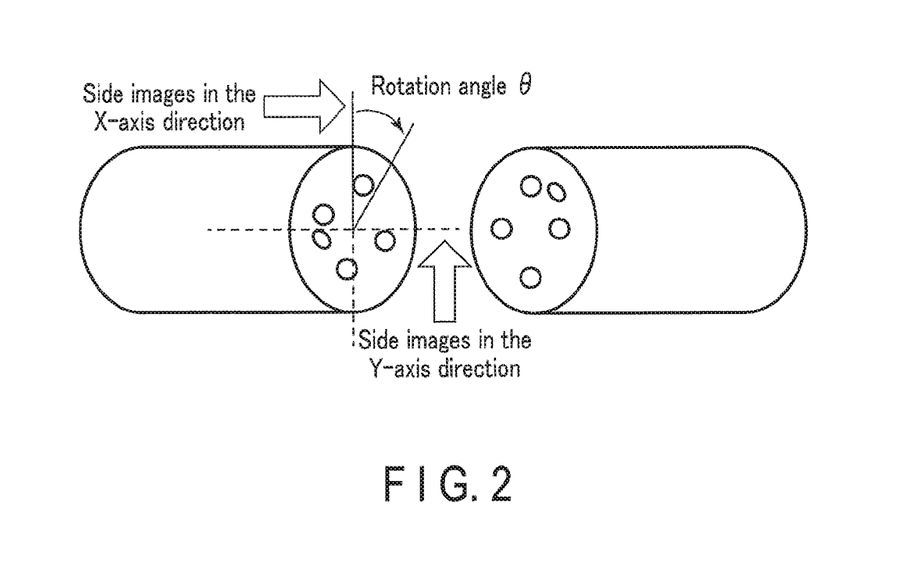
FIG. 2 is a figure showing an operation example of a photographing unit according to the first embodiment.

FIG. 2 shows an example of side images photographed by the photographing unit 20.

As shown in FIG. 2, when the optical fibers 2a and 2b are put in a plane, the horizontal and vertical directions are determined to be the X-axis direction and the Y-axis direction, respectively.

The photographing unit 20 photographs side images in the X-axis direction, and side images in the Y-axis direction. The photographing unit 20 is composed by, for example, a camera that photographs the optical fibers 2a and 2b in the X-axis direction (first direction), and a camera that photographs the optical fibers 2a and 2b in the Y-axis direction (second direction).

The gripper 30 grips the optical fiber 2a. The gripper 30 is comprised by a fiber holder in which V grooves are formed, etc., for example. The gripper 30 retains the optical fiber 2a by the fiber holder, etc.

The gripper 30 rotates the optical fiber 2a in the axis direction of the optical fiber 2a on the basis of a signal from the control unit 10. The gripper 30 comprises a driving unit, etc., and rotates the optical fiber 2a by transmitting motive power from the driving unit to the fiber holder, for example.

The gripper 40 grips the optical fiber 2b. The gripper 40 is comprised by a fiber holder in which V grooves are formed, etc., for example. The gripper 40 retains the optical fiber 2b by the fiber holder, etc.

Next, the functions achieved by the control unit 10 will be described.

Figure 3:
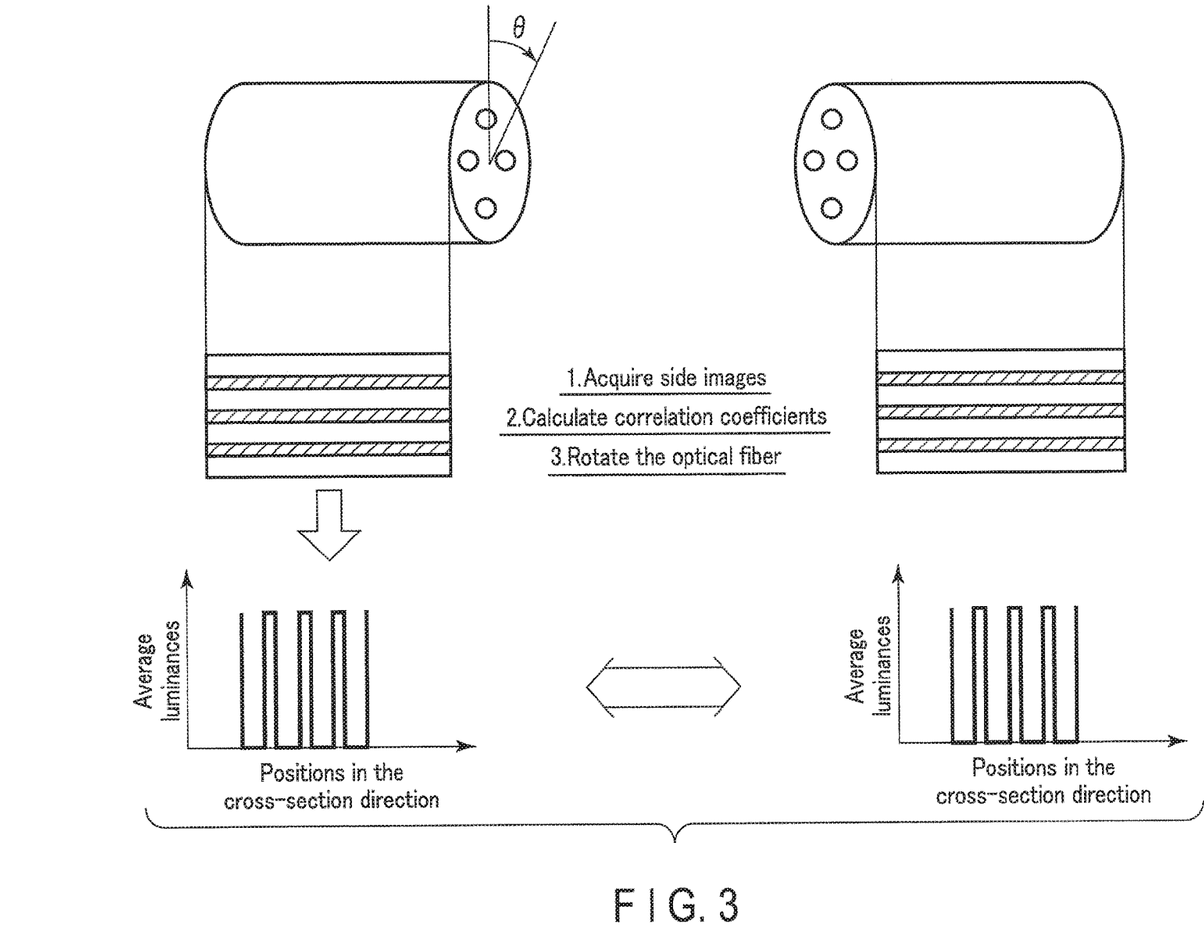
FIG. 3 is a figure for describing an operation example of the control unit according to the first embodiment.

FIG. 3 is a figure for describing the functions achieved by the control unit 10.

First, the control unit 10 has the function of acquiring side images of the optical fiber 2a, and side images (reference side images) of the optical fiber 2b (acquisition unit).

The control unit 10 acquires an image in the X-axis direction, and an image in the Y-axis direction from the photographing unit 20. The control unit 10 may transmit a signal for photographing images to the photographing unit 20, and receive an image in the X-axis direction, and an image in the Y-axis direction from the photographing unit 20, for example. The control unit 10 may acquire an image in the X-axis direction, and an image in the Y-axis direction transmitted from the photographing unit 20 with a predetermined timing.

The control unit 10 extracts a side image (first side image) of the optical fiber 2a and a side image (first reference side image) of the optical fiber 2b from an image in the X-axis direction. The control unit 10 extracts a side image (second side image) of the optical fiber 2a and a side image (second reference side image) of the optical fiber 2b from an image in the Y-axis direction.

The control unit 10 has the function of calculating correlation coefficients on the basis of the luminances of side images of the optical fiber 2a and those of side images of the optical fiber 2b (calculation unit). That is, the control unit 10 calculates a correlation coefficient between the luminances of the optical fiber 2a and those of the optical fiber 2b in the X-axis direction, and calculates a correlation coefficient between the luminances of the optical fiber 2a and those of the optical fiber 2b in the Y-axis direction.

The control unit 10 averages the luminances of side images of the optical fiber 2a along the longitudinal direction of the optical fiber 2a, for example. That is, the control unit 10 acquires a luminance string of the optical fiber 2a in the longitudinal direction, and averages the luminance string. The control unit 10 acquires the average value of the luminance string as an average luminance of the pixel value of the string (i.e., pixel value in the axis orthogonal to the longitudinal direction in the side images).

In the same manner, the control unit 10 acquires average luminances of side images of the optical fiber 2b.

The control unit 10 calculates a correlation coefficient ZNCC according to equation 1 given below, for example.

$$ZNCC = \frac{\sum_{i=0}^{M-1}\{(L(i)-\overline{L})(R(i)-\overline{R})\}}{\sqrt{\sum_{i=0}^{M-1}(L(i)-\overline{L})^2 \times \sum_{i=0}^{M-1}(R(i)-\overline{R})^2}} \quad \text{(equation 1)}$$

Here, L(i), R(i), and M respectively indicate the i-th average luminance of the optical fiber 2a, the i-th average luminance of the optical fiber 2b, and the total number of pixels.

$\overline{L}$ indicates the average value of L(i).

$\overline{R}$ indicates the average value of R(i).

Here, a correlation coefficient (first correlation coefficient) calculated from side images in the X-axis direction is determined to be a ZNCC-X, and a correlation coefficient (second correlation coefficient) calculated from side images in the Y-axis direction is determined to be a ZNCC-Y.

The control unit 10 has the function of rotating the optical fiber 2a in the axis direction of the optical fiber 2a so that correlation coefficients peak (rotation processing unit).

Here, a rotation angle is an angle at which the optical fiber 2a rotates in the axis direction of the optical fiber 2a from an initial position.

The control unit 10, once calculating correlation coefficients ZNCCs, rotates the optical fiber 2a through the gripper 30, for example. The control unit 10 once again calculates correlation coefficients ZNCCs. The control unit 10 repeats such operations, and pinpoints the peak of correlation coefficients ZNCCs.

The control unit 10 determines a rotation angle at which a ZNCC-X and a ZNCC-Y get peak values, within the scope of the ZNCC-X and the ZNCC-Y each of which exceeds a predetermined threshold, to be a rotation angle at which correlation coefficients peak, for example.

Next, an operation example of the control unit 10 will be described.

Figure 4:
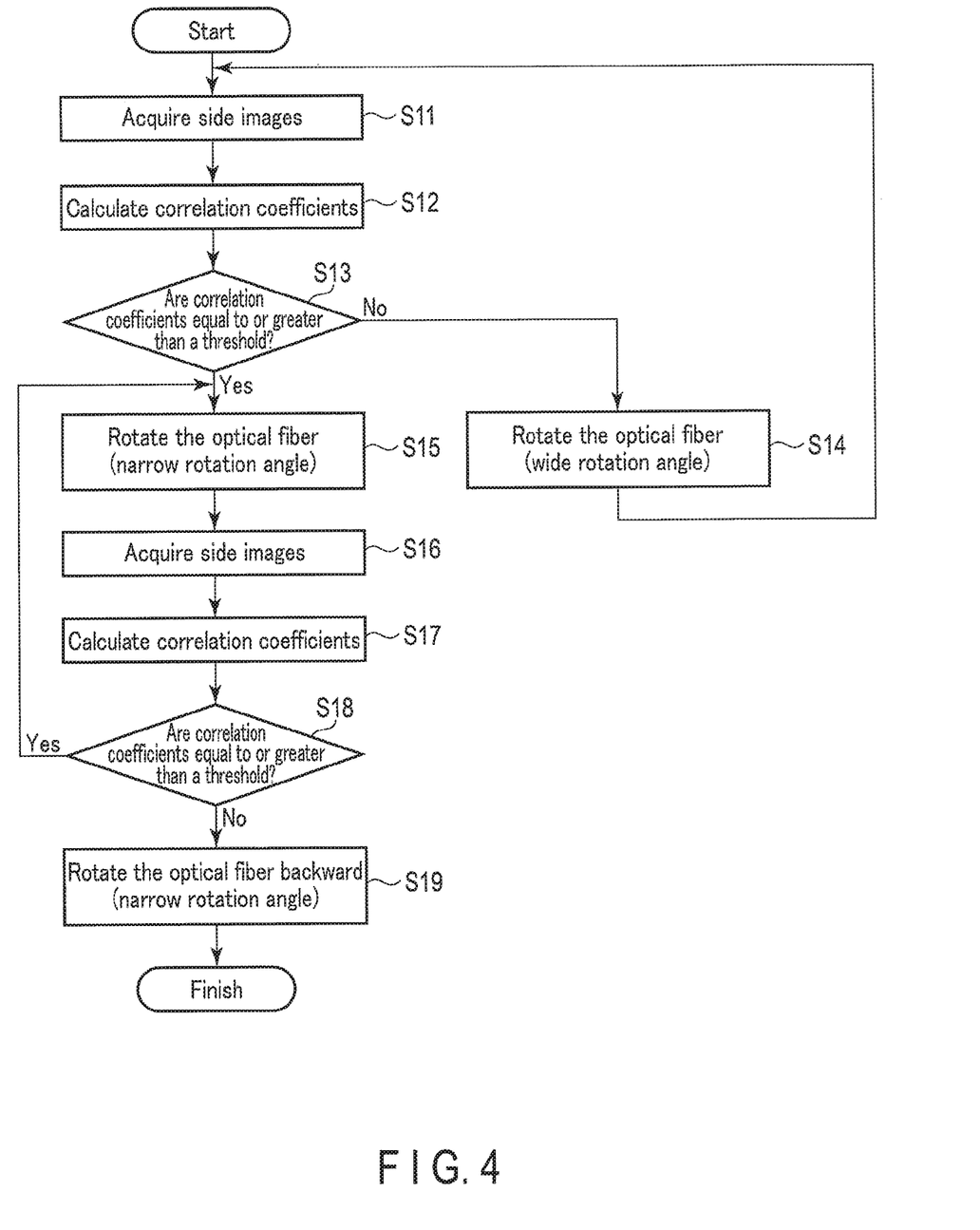
FIG. 4 is a flowchart for describing an operation example of the control unit according to the first embodiment.

FIG. 4 is a flowchart for describing an operation example of the control unit 10.

Here, the optical fiber 2a is set in the gripper 30, and the optical fiber 2b is set in the gripper 40.

First, the control unit 10 acquires side images from the photographing unit 20 (S11). That is, the control unit 10 acquires side images of the optical fibers 2a and 2b in the X-axis direction, and side images of the optical fibers 2a and 2b in the Y-axis direction.

Once the side images are acquired, the control unit 10 calculates correlation coefficients ZNCCs on the basis of the side images (S12). That is, the control unit 10 calculates a ZNCC-X and a ZNCC-Y.

Upon calculating the correlation coefficients ZNCCs, the control unit 10 determines if the correlation coefficients ZNCCs are equal to or greater than a predetermined threshold (S13). That is, the control unit 10 determines if the ZNCC-X is equal to or greater than a predetermined threshold, and the ZNCC-Y is equal to or greater than a predetermined threshold.

Once it is determined that the correlation coefficients ZNCCs are not equal to or greater than a predetermined threshold (S13, NO), the control unit 10 rotates the optical fiber 2a at a relatively wide angle (S14). Upon rotating the optical fiber 2a at a relatively wide angle, the control unit 10 returns to S11.

Once it is determined that the correlation coefficients ZNCCs are equal to or greater than a predetermined threshold (S13, YES), the control unit 10 rotates the optical fiber 2a at a relatively narrow angle (S15). Upon rotating the optical fiber 2a at a relatively narrow angle, the control unit 10 acquires side images from the photographing unit 20 (S16). Once the side images are acquired, the control unit 10 calculates correlation coefficients ZNCCs on the basis of the side images (S17).

Once the correlation coefficients ZNCCs are calculated, the control unit 10 determines if the correlation coefficients ZNCCs are equal to or greater than the preceding correlation coefficients ZNCCs (i.e., correlation coefficients ZNCCs at the preceding rotation angle) (S18). The control unit 10 may determine if a ZNCC-X is equal to or greater than a preceding ZNCC-X, and a ZNCC-Y is equal to or greater than a preceding ZNCC-Y, for example. The control unit 10 may determine if at least one of a ZNCC-X and a ZNCC-Y is equal to or greater than a preceding ZNCC-X or ZNCC-Y.

Upon determining that the correlation coefficients ZNCCs are not equal to or greater than the preceding correlation coefficients ZNCCs (S18, NO), the control unit 10 returns to S15.

When the correlation coefficients ZNCCs are determined to be equal to or greater than the preceding correlation coefficients ZNCCs (S18, YES), the control unit 10 rotates the optical fiber 2a backward at an angle that cancels the rotation in S15 (S19).

Upon rotating the optical fiber 2a backward, the control unit 10 finishes the operations.

Next, the specific embodiments will be described.

First, a configuration example of an optical fiber 2 (2a and 2b) will be described.

Figure 5A:
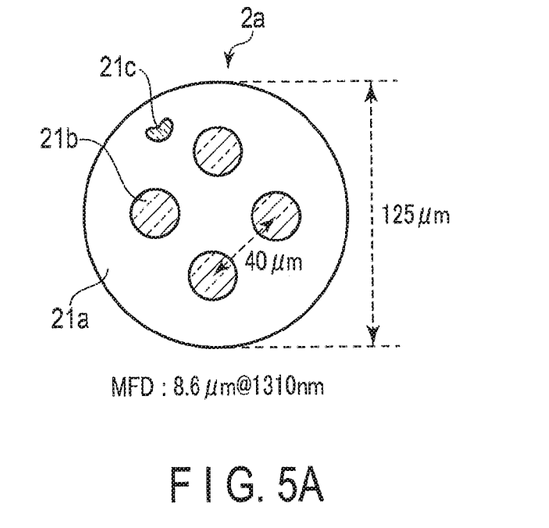
FIG. 5A is a figure showing a configuration example of an optical fiber according to the first embodiment.
Figure 5B:
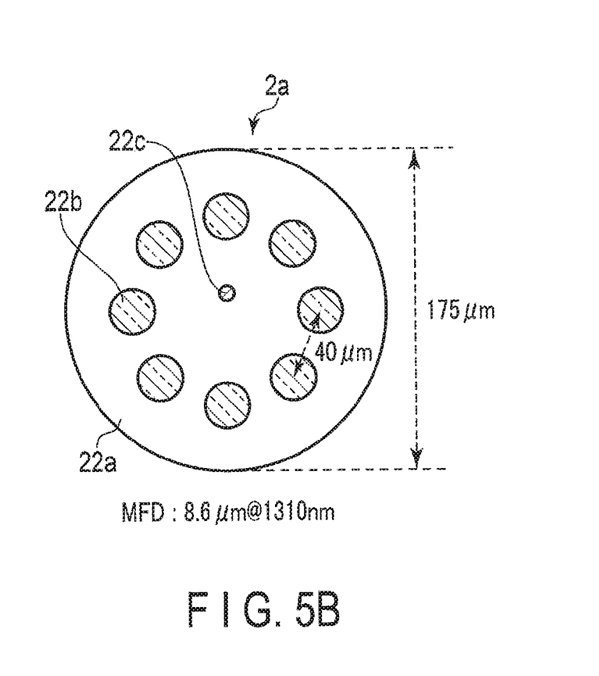
FIG. 5B is a figure showing a configuration example of an optical fiber according to the first embodiment.

FIG. 5 show examples of section views of the optical fiber 2.

Here, a case where the optical fiber 2 is a four-core fiber or an eight-core fiber will be described.

FIG. 5(a) shows an example of a section view when the optical fiber 2 is a four-core fiber.

As shown in FIG. 5(a), the optical fiber 2 is comprised by a circular cladding 21a, four cores 21b, a marker 21c, etc.

The four cores 21b are formed in positions that are symmetric to one another with respect to the central portion of the cladding 21a.

The marker 21c is comprised by a material whose refractive index is lower than the cladding 21a. The marker 21c may be a hole. The marker 21c is formed further to an outer side than the four cores 21b.

Here, the core gap, the cladding, and the mode field diameter in a wavelength of 1310 nm are 40 μm, 125 μm, and 8.6 μm, respectively.

FIG. 5(b) shows an example of a section view when the optical fiber 2 is an eight-core fiber.

As shown in FIG. 5(b), the optical fiber 2 is comprised by a circular cladding 22a, eight cores 22b, a marker 22c, etc.

The eight cores 22b are formed in positions that are symmetric to one another with respect to the central portion of the cladding 22a.

The marker 22c is comprised by a material whose refractive index is lower than the cladding 22a. The marker 22c may be a hole. The marker 22c is formed further to an inner side than the four cores 22b.

Here, the core gap, the cladding, and the mode field diameter in a wavelength of 1310 nm are 40 μm, 175 μm, and 8.6 μm, respectively.

Next, the relationships between average luminances and pixel values will be described.

Figure 6A:
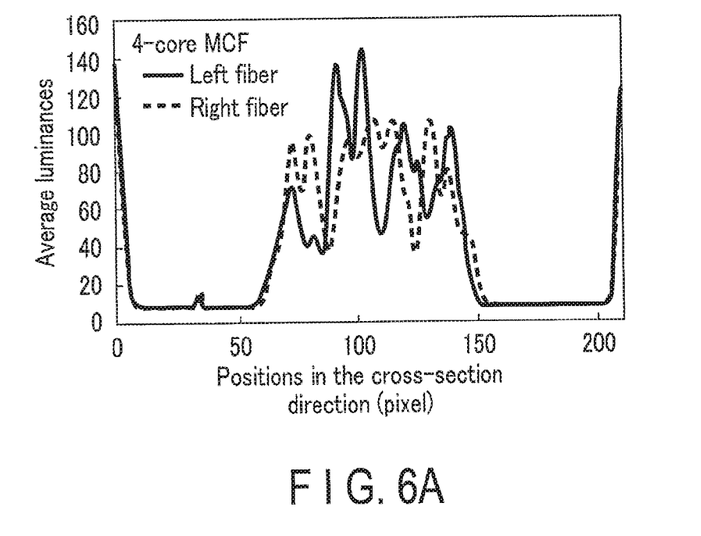
FIG. 6A is a figure showing an example of the luminances of side images according to the first embodiment.
Figure 6B:
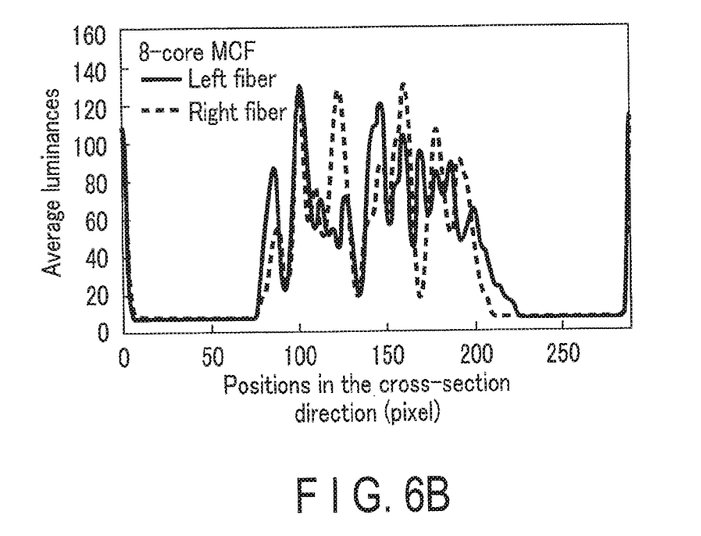
FIG. 6B is a figure showing an example of the luminances of side images according to the first embodiment.
Figure 6C:
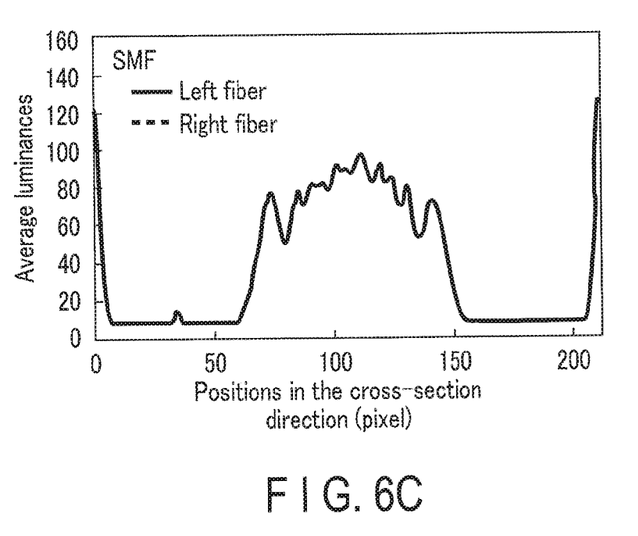
FIG. 6C is a figure showing an example of the luminances of side images according to the first embodiment.

FIG. 6 are graphs showing the relationships between average luminances and pixel values in the X-axis direction at predetermined rotation angles.

In FIG. 6, the horizontal axes indicate positions (pixel values) in the cross-section direction, and the vertical axes indicate average luminance values. The solid lines indicate the average luminances of the optical fiber 2a. The broken lines indicate the average luminances of the optical fiber 2b.

FIG. 6(a) shows an example when the optical fiber 2 is a four-core fiber (case of FIG. 5(a)). FIG. 6(b) shows an example when the optical fiber 2 is an eight-core fiber (case of FIG. 5(b)). FIG. 6(c) shows an example when the optical fiber 2 is a single-mode fiber.

As shown in FIGS. 6(a) and 6(b), when the optical fiber 2 is a multi-core fiber, a plurality of clear peaks are observed. The more the number of cores increases, the more the number of peaks also increases. When the optical fiber 2 is a multi-core fiber, the curve of the average luminances of the optical fiber 2a and that of the average luminances of the optical fiber 2b differ from each other.

As shown in FIG. 6(c), when the optical fiber 2 is a single-mode fiber, since the cross section configuration is concentric, the average luminances are symmetric with respect to the central axis of the optical fiber 2. The curve of the average luminances of the optical fiber $2a$ and that of the average luminances of the optical fiber $2b$ are nearly correspondent.

The ZNCC-Xs in FIGS. 6(a), 6(b), and 6(c) are 0.848, 0.847, and 0.999, respectively.

Next, the relationships between rotation angles and correlation coefficients will be described.

Figure 7:
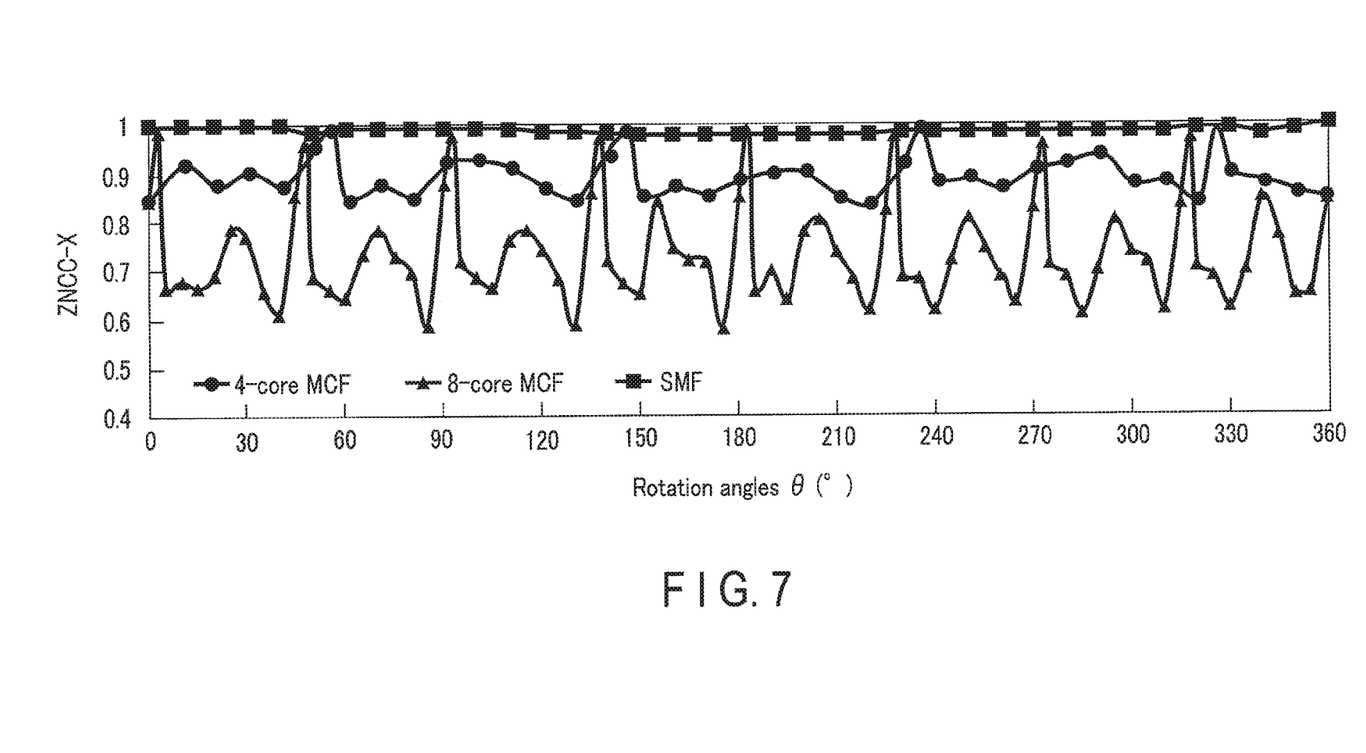
FIG. 7 is a figure showing an example of the relationships between rotation angles and correlation coefficients according to the first embodiment.

FIG. 7 is a graph showing the relationships between rotation angles, and correlation coefficients obtainable from side images in the X-axis direction.

In FIG. 7, the horizontal axis indicates rotation angles of the optical fiber $2a$, and the vertical axis indicates ZNCC-Xs. The plotted circles indicate ZNCC-Xs when the optical fiber 2 is a four-core fiber. The plotted triangles indicate ZNCC-Xs when the optical fiber 2 is an eight-core fiber. The plotted squares indicate ZNCC-Xs when the optical fiber 2 is a single-mode fiber.

As shown in FIG. 7, when the optical fiber 2 is a four-core fiber, there are four peaks at 90-degree intervals at rotation angles of 0 to 360 degrees. The number of peaks, and intervals correspond to the number of cores, and disposition of the optical fiber 2.

When the optical fiber 2 is a four-core fiber, the peak values of ZNCC-Xs are 0.994, 0.990, 0.990, and 0.993 in the order of angle from narrowest to widest. The peak value around 60 degrees is the highest. At a rotation angle corresponding to the peak value around 60 degrees, the marker $21c$ of the optical fiber $2a$ and the marker $21c$ of the optical fiber $2b$ are correspondent. Accordingly, it has turned out that when there is a marker more to an outer side than the cores, it is possible to align a rotation angle as well as the marker.

As shown in FIG. 7, when the optical fiber 2 is an eight-core fiber, there are eight peaks at 45-degree intervals at rotation angles of 0 to 360 degrees. The number of peaks and intervals correspond to the number of cores, and disposition of the optical fiber 2. When the optical fiber 2 is an eight-core fiber, ZNCC-Xs have a clearer dependency on rotation angles than the optical fiber 2 that is a four-core fiber. This would be because more cores overlapping strengthens the contrast of stripes of a side image, and influences correlation coefficients between the average luminances of the optical fiber $2a$ and the average luminances of the optical fiber $2b$.

When the optical fiber 2 is a four-core or eight-core fiber, it has been confirmed that at rotation angles corresponding to peak values, the maximum light power is obtained by active alignment.

When the optical fiber 2 is a single-mode fiber, ZNCC-Xs have almost no dependency on rotation angles.

Next, the relationships between correlation coefficients and connection losses will be described.

Here, a case where the optical fiber 2 is a four-core fiber will be described.

Figure 8:
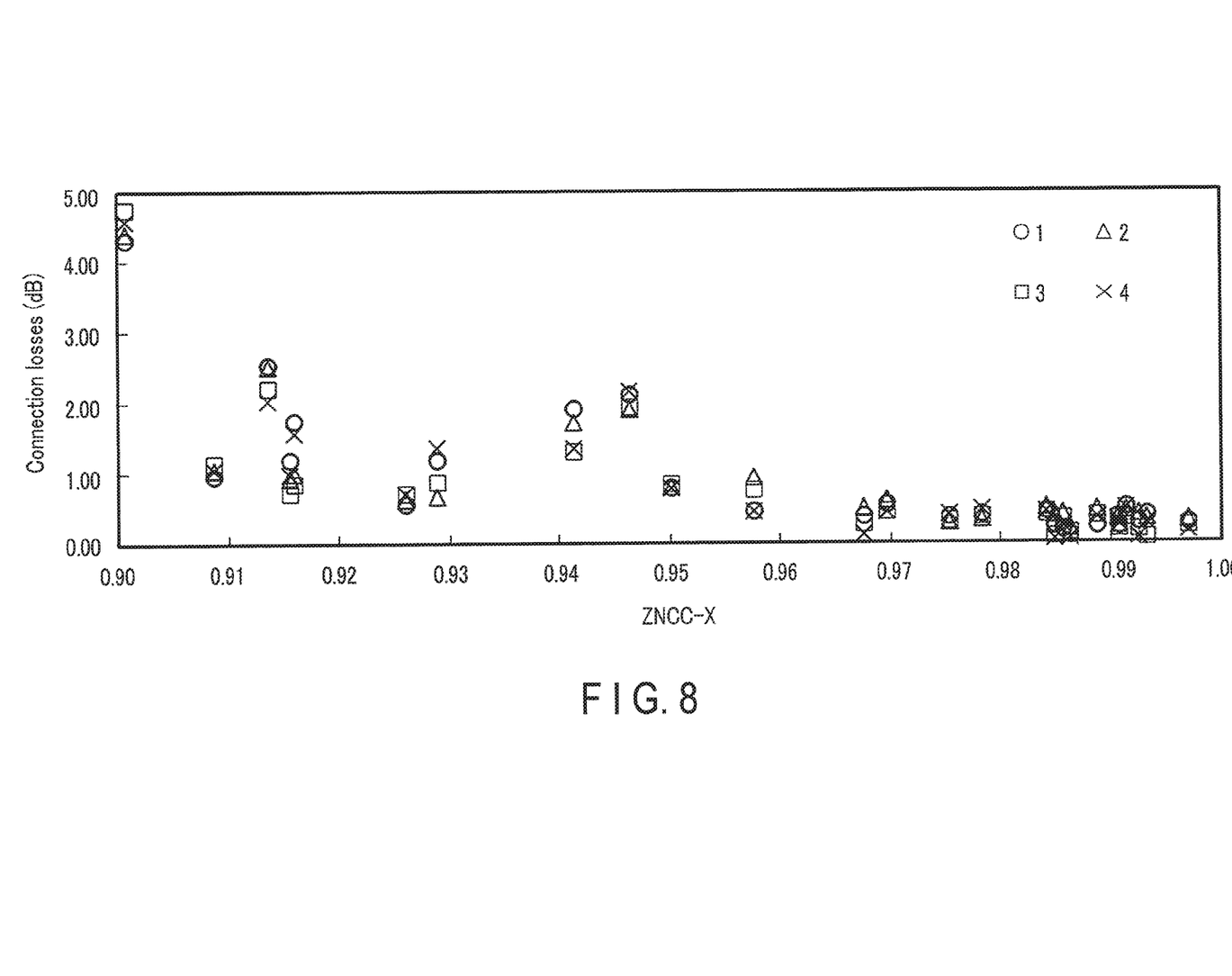
FIG. 8 is a figure showing an example of the relationships between correlation coefficients in the X-axis direction and connection losses according to the first embodiment.
Figure 9:
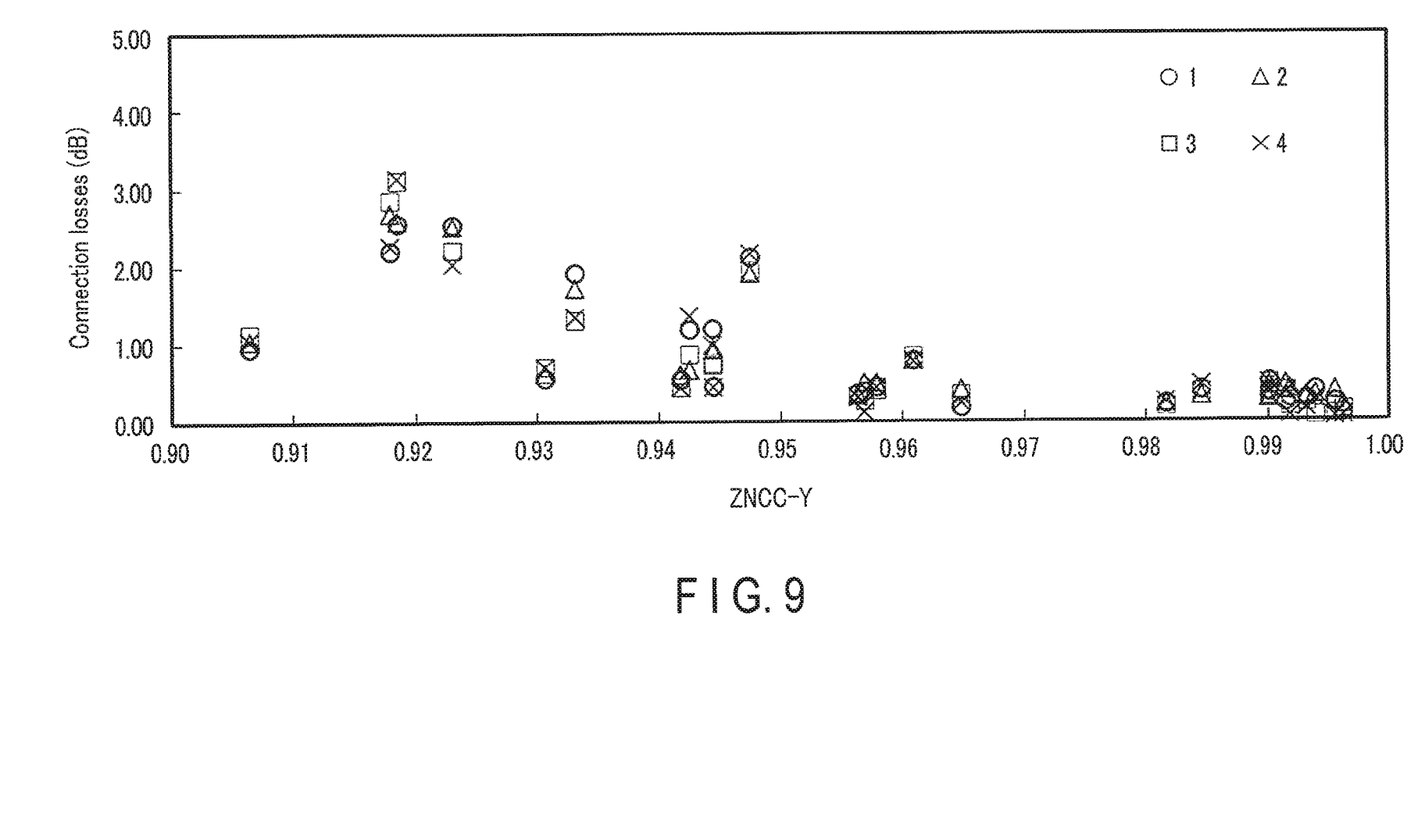
FIG. 9 is a figure showing an example of the relationships between correlation coefficients in the Y-axis direction and connection losses according to the first embodiment.

FIGS. 8 and 9 are graphs showing the relationships between correlation coefficients, and connection losses when the optical fibers $2a$ and $2b$ are fusion-spliced.

FIGS. 8 and 9 show connection losses of the four cores $21b$ ($21b$-1 to $21b$-4) of the optical fiber 2. FIG. 8 is a graph showing the relationships between ZNCC-Xs and connection losses. FIG. 9 is a graph showing the relationships between ZNCC-Ys and connection losses.

In FIGS. 8 and 9, the horizontal axes indicate correlation coefficients (ZNCC-Xs in FIG. 8, and ZNCC-Ys in FIG. 9). The vertical axes indicate connection losses (dB). The plotted circles, triangles, squares, and crosses indicate connection losses of the core $21b$-1, the core $21b$-2, the core $21b$-3, and the core $21b$-4, respectively.

As shown in FIGS. 8 and 9, as ZNCC-Xs and ZNCC-Ys get closer to 1, connection losses decrease. As also shown in FIG. 8, when ZNCC-Xs are equal to or greater than 0.975, connection losses get equal to or less than 0.5 dB. As shown in FIG. 9, when ZNCC-Ys are equal to or greater than 0.964, connection losses get equal to or less than 0.5 dB.

Here, the maximum value of connection losses obtained by active alignment is 0.5 dB.

The connection loss of 0.5 dB is considered to be caused by core position accuracy inherently comprised by a measured four-core fiber. Accordingly, by performing rotation alignment so that correlation coefficients obtain a peak value by use of side images of the optical fiber 2, low connection losses that are nearly equal to those in active alignment can be achieved.

Figure 10:
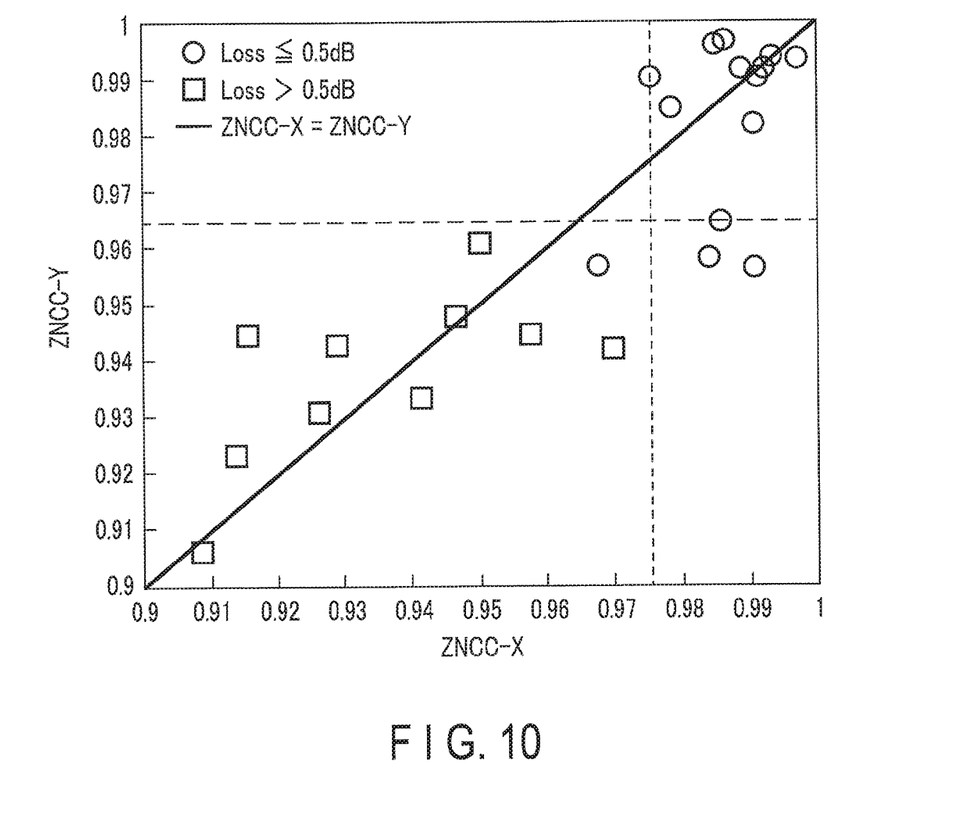
FIG. 10 is a figure showing an example of the relationships between correlation coefficients in the X-axis direction and correlation coefficients in the Y-axis direction according to the first embodiment.

FIG. 10 is a figure showing the relationships between ZNCC-Xs and ZNCC-Ys.

In FIG. 10, the horizontal axis indicates ZNCC-Xs, and the vertical axis indicates ZNCC-Ys. The plotted circles indicate that connection losses are equal to or less than 0.5 dB. The plotted squares indicate that connection losses are equal to or greater than 0.5 dB.

The dotted line indicates the threshold of ZNCC-Xs at which connection losses get equal to or less than 0.5 dB (e.g., 0.975). The broken line indicates the threshold of ZNCC-Ys at which connection losses get equal to or less than 0.5 dB (e.g., 0.964).

By setting a rotation angle so that a ZNCC-X and a ZNCC-Y obtain peak values within the scope of the ZNCC-X and the ZNCC-Y each of which is equal to or greater than a predetermined threshold, a low connection loss can be achieved. For example, a threshold is set at 0.964, and by setting a rotation angle so that both a ZNCC-X and a ZNCC-Y obtain peak values within the scope of the ZNCC-X and the ZNCC-Y each of which is equal to or greater than the threshold, a connection loss can be reduced.

An alignment apparatus configured as above obtains side images of an optical fiber. The alignment apparatus calculates average luminances from the side images. The alignment apparatus defines a rotation angle at which correlation coefficients between the average luminances of the optical fiber and those of another optical fiber peak as an aligned rotation angle. As a result, the alignment apparatus can efficiently align the optical fiber.

Second Embodiment

Next, the second embodiment will be described.

The alignment apparatus according to the second embodiment differs from that in the first embodiment in that an optical fiber is aligned with respect to a connector.

Figure 11:
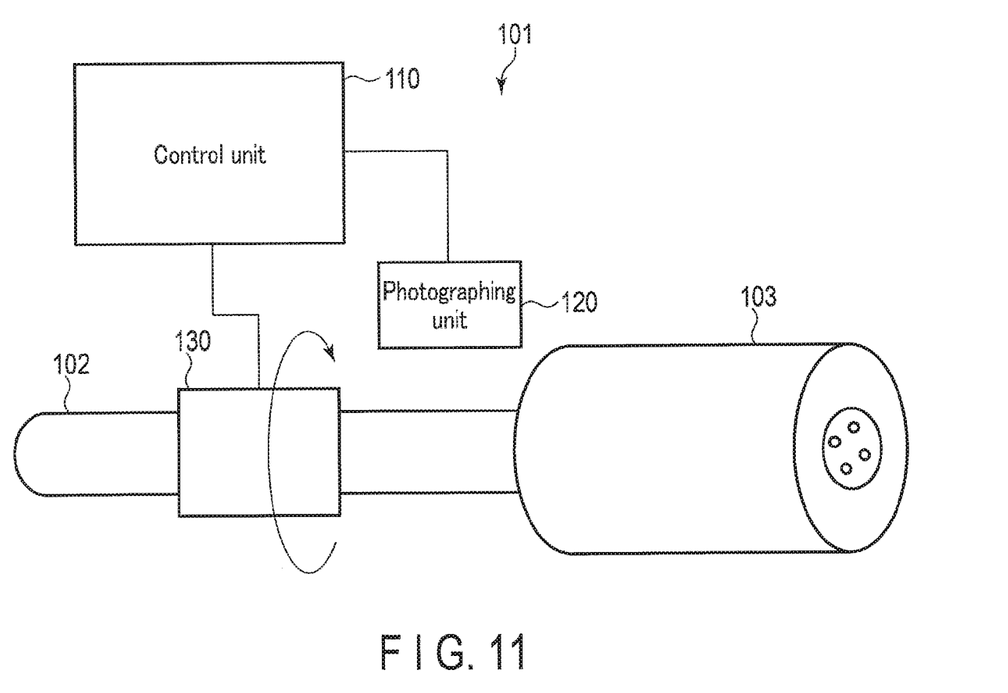
FIG. 11 is a block diagram showing a configuration example of the alignment apparatus according to the second embodiment.

FIG. 11 shows a configuration example of an alignment apparatus 101 according to the second embodiment.

Here, the alignment apparatus 101 aligns an optical fiber 102 with a connector 103 at a predetermined angle. The optical fiber 102 is configured in the same manner as the optical fiber 2. The connector 103 is an SC ferrule or an MT ferrule, for example.

As shown in FIG. 11, the alignment apparatus 101 comprises a control unit 110, a photographing unit 120, a gripper 130, etc.

The control unit 110 controls the whole of the alignment apparatus 101. The control unit 110 aligns the optical fiber 102 on the basis of images photographed by the photographing unit 120.

The control unit 110 is comprised by a CPU, a ROM, a RAM, an NVM, and an interface, for example. The control unit 110 may be a desktop PC, a notebook PC, or a tablet PC, for example.

The functions achieved by the control unit 110 can be achieved by execution of a program by the CPU, for example. That is, the program is used for a computer that operates as at least a part of the alignment apparatus 101.

The photographing unit 120 photographs side images of the optical fiber 102. The photographing unit 120 is configured in the same manner as the photographing unit 20.

The gripper 130 retains the optical fiber 102, and rotates the optical fiber 102 in the axis direction of the optical fiber 102 on the basis of a signal from the control unit 110. The gripper 130 is configured in the same manner as the gripper 30.

The control unit 110 previously stores reference side images. Here, the reference side images are side images of the optical fiber 102 at an appropriate rotation angle (aligned rotation angle).

The control unit 110 aligns the optical fiber 102 on the basis of the side images of the optical fiber 102 and the reference side images. That is, the control unit 110 rotates the optical fiber 102 so that correlation coefficients between the average luminances of the side images of the optical fiber 102 and those of the reference side images peak. The method for aligning the optical fiber 102 by the control unit 110 is the same as the method for aligning the optical fiber 2a by the control unit 10.

The control unit 110 may previously store the average luminances of the reference side images.

The alignment apparatus 101 is applied to alignment of a rotation angle of an optical fiber with respect to various members of a connector, such as fixation to the flange of an optical fiber adhesively fixed to a ferrule.

An alignment apparatus configured as above can rotate an optical fiber at an angle at which correlation coefficients between the average luminances of reference side images and those of side images of the optical fiber peak. As a result, the alignment apparatus can rotate the optical fiber at an appropriate angle with respect to a connector. Accordingly, the alignment apparatus can align a rotation angle of the optical fiber with respect to the connector.

The present invention is not restricted to the above embodiments as they are, but can be embodied in an implementation phase by a change of components within the scope of the gist. In addition, various inventions can be formed by proper combination of a plurality of components described in the above embodiments. For example, some components may be deleted from all the components shown in the embodiments. Furthermore, components crossing over different embodiments may be combined as necessary.

The method described in each embodiment can be, as a program (software means) that can be executed by a calculator (computer), stored in a storage medium such as a magnetic disk (floppy (registered trademark) disk, hard disk, etc.), an optical disk (CD-ROM, DVD, MO, etc.), and a semiconductor memory (ROM, RAM, flash memory, etc.), and distributed through transmission by a communication medium. A program to be stored in a medium also encompasses a setting program that has a calculator configure a software means to be executed by the calculator (not only an execution program, but also a table or a data configuration). A calculator for achieving the present apparatus reads a program recorded in a storage medium, or, according to circumstances, constructs by a setting program a software means, which controls operation, thereby executing the above processing. A storage medium in this specification is not restricted to distribution use, and encompasses a storage medium such as a magnetic disk, and a semiconductor memory provided in a calculator, or in equipment connected through a network.

The invention claimed is:

1. An alignment apparatus that aligns a multi-core optical fiber whose cross section has a marker, comprising:
   an acquisition unit that acquires one or more side images of the multi-core optical fiber;
   a calculation unit that averages luminances of the side image in an axis direction of the multi-core optical fiber, averaging luminances of each of one or more reference side images in an axis direction of the multi-core optical fiber, and calculates coefficients between averaged luminances of the side image and averaged luminances of the reference side image; and
   a rotation processing unit that rotates the multi-core optical fiber in an axis direction of the multi-core optical fiber so that the correlation coefficients peak,
   wherein the calculation unit calculates correlation coefficients according to $$ZNCC = \frac{\sum_{i=0}^{M-1} \{(L(i) - \overline{L})(R(i) - \overline{R})\}}{\sqrt{\sum_{i=0}^{M-1} (L(i) - \overline{L})^2 \times \sum_{i=0}^{M-1} (R(i) - \overline{R})^2}}$$

where $L(i)$ indicates the i-th average luminance of the multi-core optical fiber;
$R(i)$ indicates the i-th average luminance of another optical fiber;
$\overline{L}$ indicates the average value of $L(i)$;
$\overline{R}$ indicates the average value of $R(i)$;
M is the total number of pixels; and
i indicates positions in a cross-section direction of the multi-core optical fiber.

2. The alignment apparatus according to claim 1, wherein the acquisition unit acquires a first side image photographed in a first direction of the multi-core optical fiber, and a second side image photographed in a second direction different from the first direction,
the reference side image is comprised by a first reference side image corresponding to the first side image, and a second reference side image corresponding to the second side image, and
the calculation unit averages luminances of the first side image and luminances of the first reference side image in an axis direction of the multi-core optical fiber, calculates a first correlation coefficient from averaged luminances of the first side image and averaged luminances of the first reference side image, averages luminances of the second side image and luminances of the second reference side image in an axis direction of the multi-core optical fiber, and calculates a second correlation coefficient from averaged luminances of the second side image and averaged luminances of the second reference side image, as the correlation coefficients.

3. The alignment apparatus according to claim 2, wherein the rotation processing unit rotates the multi-core optical fiber so that the first correlation coefficient and the second correlation coefficient peak within a scope of the first correlation coefficient and the second correlation coefficient each of which is equal to or greater than 0.964.

4. The alignment apparatus according to claim 3, wherein the reference side image is a side image of a multi-core optical fiber aligning with the multi-core optical fiber.

5. The alignment apparatus according to claim 3, wherein the reference side image is a side image of a multi-core optical fiber at a predetermined angle.

6. The alignment apparatus according to claim 2, wherein the second direction is orthogonal to the first direction.

7. The alignment apparatus according to claim 6, wherein the reference side image is a side image of a multi-core optical fiber aligning with the multi-core optical fiber.

8. The alignment apparatus according to claim 6, wherein the reference side image is a side image of a multi-core optical fiber at a predetermined angle.

9. The alignment apparatus according to claim 2, wherein the reference side image is a side image of a multi-core optical fiber aligning with the multi-core optical fiber.

10. The alignment apparatus according to claim 2, wherein the reference side image is a side image of a multi-core optical fiber at a predetermined angle.

11. The alignment apparatus according to claim 1, wherein the reference side image is a side image of a multi-core optical fiber aligning with the multi-core optical fiber.

12. The alignment apparatus according to claim 11, wherein the reference side image is a side image of a multi-core optical fiber at a predetermined angle.

13. The alignment apparatus according to claim 1, wherein the reference side image is a side image of a multi-core optical fiber at a predetermined angle.

14. An alignment method that aligns a multi-core optical fiber whose cross section has a marker, comprising:

acquiring one or more side images of the multi-core optical fiber;

averaging luminances of the side images of the multi-core optical fiber;

averaging luminances of each of one or more reference side images in an axis direction of the multi-core optical fiber;

calculating coefficients between averaged luminances of the side image and averaged luminances of the reference side image; and rotating the multi-core optical fiber in an axis direction of the multi-core optical fiber so that the correlation coefficients peak;

wherein the correlation coefficients are calculated according to $$ZNCC = \frac{\sum_{i=0}^{M-1} \{(L(i) - \bar{L})(R(i) - \bar{R})\}}{\sqrt{\sum_{i=0}^{M-1} (L(i) - \bar{L})^2 \times \sum_{i=0}^{M-1} (R(i) - \bar{R})^2}}$$

where L(i) indicates the i-th average luminance of the multi-core optical fiber;

R(i) indicates the i-th average luminance of another optical fiber;

$\bar{L}$ indicates the average value of L(i);

$\bar{R}$ indicates the average value of R(i);

M is the total number of pixels; and i indicates positions in a cross-section direction of the multi-core optical fiber.

\* \* \* \* \*